(12) United States Patent
Bruderick et al.

(10) Patent No.: US 6,805,400 B2
(45) Date of Patent: Oct. 19, 2004

(54) FENDER SUPPORT SYSTEM

(75) Inventors: Mark L. Bruderick, Clarkston, MI (US); Mike Shinedling, Oxford, MI (US); Richard P. Thomas, Clarkston, MI (US); Daniel J Pearlman, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/310,504

(22) Filed: Dec. 5, 2002

(65) Prior Publication Data

US 2004/0108753 A1 Jun. 10, 2004

(51) Int. Cl.[7] .............................................. B60R 27/00
(52) U.S. Cl. ............. 296/193.09; 296/198; 296/203.03; 296/209; 296/181.2; 296/181.4
(58) Field of Search ........................... 296/193.09, 198, 296/203.01, 203.03, 203.02, 209, 181.2, 181.4

(56) References Cited

U.S. PATENT DOCUMENTS

| | | | | | |
|---|---|---|---|---|---|
| 4,955,663 | A | * | 9/1990 | Imura ..................... | 296/203.02 |
| 5,031,958 | A | * | 7/1991 | Fujita et al. ........... | 296/203.02 |
| 5,466,033 | A | * | 11/1995 | Murakami et al. ..... | 296/203.02 |
| 5,597,198 | A | * | 1/1997 | Takanishi et al. ...... | 296/193.09 |
| 6,409,255 | B2 | * | 6/2002 | Tilsner et al. .......... | 296/203.02 |
| 6,523,886 | B2 | * | 2/2003 | Hoffner et al. ........ | 296/203.02 |
| 6,608,133 | B2 | * | 8/2003 | Kurasawa et al. ........... | 524/496 |
| 2002/0195839 | A1 | * | 12/2002 | Nishijima .................. | 296/194 |
| 2003/0141745 | A1 | * | 7/2003 | Henderson et al. .... | 296/203.02 |

* cited by examiner

Primary Examiner—Lori L. Coletta
(74) Attorney, Agent, or Firm—Donald J. Wallace

(57) ABSTRACT

A fender support system, including at least one molded fender support arrangement configured to couple to at least one fender arrangement, in which the fender support arrangement is configured to provide at least one of primary and secondary attachments for under-the-hood vehicle components.

6 Claims, 7 Drawing Sheets

FENDER SUPPORT SYSTEM

FIELD OF THE INVENTION

The present invention relates to a fender support system including carbon fiber SMC.

BACKGROUND INFORMATION

It is believed that a primary objective of the automotive industry is to develop new technologies to maximize vehicle performance, while maintaining low vehicle mass.

Compression Molded Sheet Molding Compound (SMC) or Kevlar, for example, allows much greater design flexibility than previous automotive applications of carbon fiber (i.e., hand lay-up, vacuum-bag composites). While it is believed that carbon fiber SMCs have been commercially available for 16 years, the application of these materials in the automotive industry has been slow to develop, due to the high cost of carbon fibers and the general lack of understanding concerning the characteristics of carbon fiber composites.

However, recent developments have reduced the costs associated with producing carbon fiber SMCs, and programs sponsored by the U.S. Department of Energy are exploring methods to fundamentally change the production of carbon fibers for purposes of further reducing costs. Work within the Automotive Composites Consortium and studies at the Oak Ridge National Laboratory are providing a better understanding of the performance and durability characteristics of commercial grade composites containing carbon fibers.

Carbon fiber SMC is compounded and molded in a manner similar to conventional structural-grade glass fiber SMC, for example, carbon fiber SMC materials produced by Quantum Composites in Bay City, Mich. AMC™-8590, for example, is a toughened vinyl ester resin with a 25 mm random chopped 12 K PAN based carbon fiber tows. AMC™-8595 contains a continuous, unidirectional cross-stitched mat with a similar 12 K carbon fibers and a similar toughened vinyl ester matrix as AMC™-8590.

Advantages of carbon fibers in SMC include higher modulus and lower specific gravity relative to glass fibers. The modulus of commercial-grade carbon fibers is approximately 230 GPa, which is more than three times higher than E-glass fibers. In addition, the 1.8 specific gravity of carbon fibers is about 70% of the specific gravity of glass fibers.

Until now, it is believed that under-the-hood and external attachment arrangements for vehicle components were designed as separate parts, which were subsequently fixedly joined, for example, by welding, rivets, screws, etc. These under-the-hood and external attachment arrangements may include separate attachments for a hood hinge, a washer hose, a security switch, a cooling pressure bottle, a splash shield, a washer bottle, an oil line, a coolant line, an oil cooler, a radiator, a hood slam pad, a belly pan, a wiring harness, a brake cooling duct, a fog lamp access cover, an engine controller, a fuel purge solenoid, a clutch fluid reservoir, a power center and fuse panel, a hood prop stud, a hood side bumper, a headlamp, a front fascia, a hood, a fender, a side sill, and/or a cowl screen.

Providing under-the-hood and external attachment arrangements in this manner, however, may be very expensive and time consuming.

SUMMARY OF THE INVENTION

It is an object of the present invention to provide a fender support system, including at least one molded fender support arrangement configured to couple to at least one fender arrangement; wherein the fender support includes carbon fiber SMC.

It is another object of the present invention to provide the fender support system described above, in which the fender support arrangement includes at least one headlight support arrangement.

It is still another object of the present invention to provide the fender support system described above, in which the headlight support arrangement includes carbon fiber SMC.

It is yet another object of the present invention to provide the fender support system described above, in which the fender support arrangement includes at least one fender-to-sill bracket.

It is still another object of the present invention to provide the fender support system described above, in which the fender-to-sill bracket includes carbon fiber SMC.

It is yet another object of the present invention to provide the fender support system described above, in which the molded fender support arrangement includes at least one fender support, at least one headlight support, and at least one fender-to-sill support, each of the fender support, the headlight support, and the fender-to-sill support being molded as a single carbon fiber SMC part.

It is still another object of the present invention to provide the fender support system described above, further including a chassis interface arrangement configured to couple the fender support arrangement to a vehicle body.

It is yet another object of the present invention to provide the fender support system described above, in which the fender support arrangement includes a dash interface arrangement and a frame interface arrangement.

It is still another object of the present invention to provide the fender support system described above, in which the fender support arrangement is configured to provide at least one of primary and secondary attachments for under-the-hood vehicle components.

It is yet another object of the present invention to provide the fender support system described above, in which the under-the-hood vehicle components include at least one of a hood hinge, a washer hose, a security switch, a cooling pressure bottle, a splash shield, a washer bottle, an oil line, a coolant line, an oil cooler, a radiator, a hood slam pad, a belly pan, a wiring harness, a brake cooling duct, a fog lamp access cover, an engine controller, a fuel purge solenoid, a clutch fluid reservoir, a power center and fuse panel, a hood prop stud, and a hood side bumper.

It is still another object of the present invention to provide the fender support system described above, in which the fender support arrangement is configured to provide at least one of primary and secondary attachments for external components.

It is yet another object of the present invention to provide the fender support system described above, in which the external components include at least one of a headlamp, a front fascia, a hood, a fender, a side sill, and a cowl screen.

It is still another object of the present invention to provide the fender support system described above, in which the fender support arrangement is molded entirely from carbon fiber SMC.

It is yet another object of the present invention to provide a vehicle, including a fender support system including at least one molded fender support arrangement configured to couple to at least one fender arrangement, the fender support including carbon fiber SMC; and a vehicle body coupled to the fender support system.

It is still another object of the present invention to provide the vehicle described above, in which the fender support arrangement includes at least one headlight support arrangement.

It is yet another object of the present invention to provide the vehicle described above, in which the headlight support arrangement includes carbon fiber SMC.

It is still another object of the present invention to provide the vehicle described above, in which the fender support arrangement includes at least one fender-to-sill bracket.

It is yet another object of the present invention to provide the vehicle described above, in which the fender-to-sill bracket includes carbon fiber SMC.

It is still another object of the present invention to provide the vehicle described above, in which the molded fender support arrangement includes at least one fender support, at least one headlight support, and at least one fender-to-sill support, each of the fender support, the headlight support, and the fender-to-sill support being molded as a single carbon fiber SMC part.

DETAILED DESCRIPTION

Figure 1:
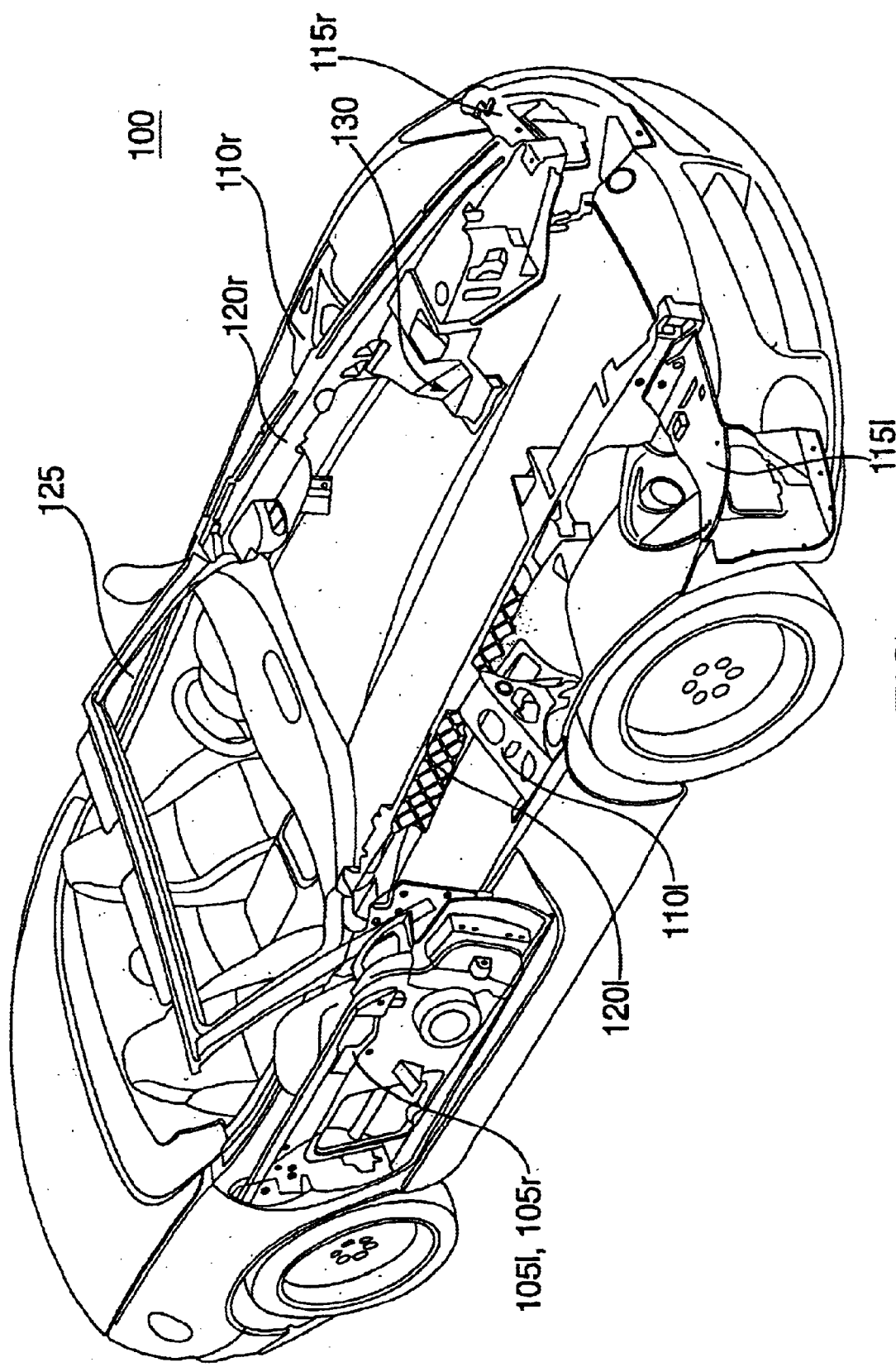
FIG. 1 shows an exemplary vehicle according to the present invention.

Referring now to FIG. 1, there is seen an exemplary vehicle 100 according to the present invention, including fender support system 130, which includes right and left fender supports 120$l$, 120$r$, right and left sill to fender brackets 110$l$, 110$r$, and right and left headlight supports 115$l$, 115$r$. Vehicle 100 is also shown as including right and left door inner panel hybrids 105$l$, 105$r$, as well as outer and inner windshield surround panel hybrid 125.

Figure 2:
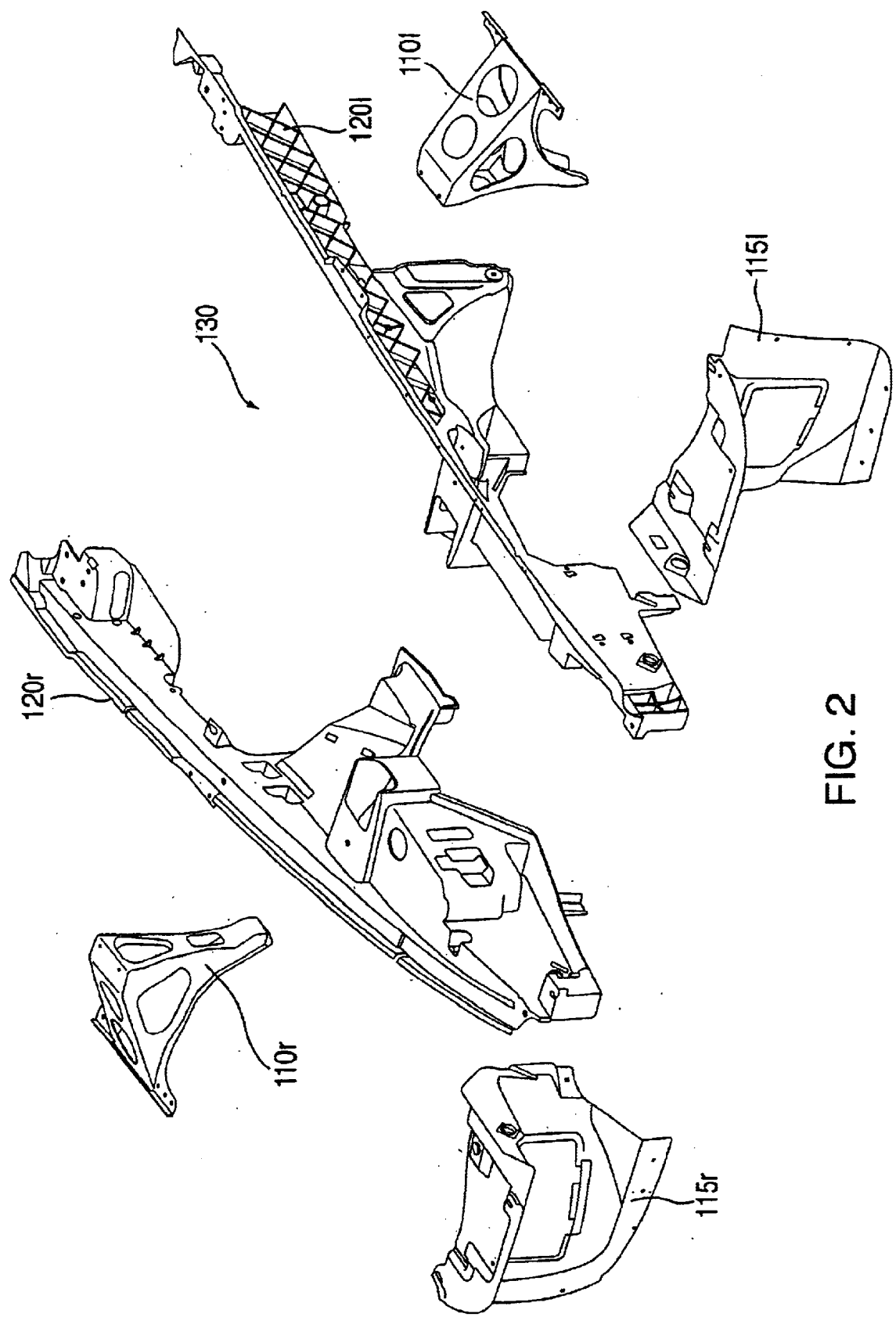
FIG. 2 shows an exemplary fender support system according to the present invention.

Referring to FIG. 2, there is seen the exemplary fender support system 130 illustrated in FIG. 1. As shown in FIG. 2, fender support system 130 includes fender supports 120$l$, 120$r$, headlamp supports 115$l$, 115$r$, and sill to fender brackets 110$l$, 110$r$. Each of the fender supports 120$l$, 120$r$, headlamp supports 115$l$, 115$r$, and sill to fender brackets 110$l$, 110$r$, are molded, at least in part, from carbon fiber SMC.

Although FIG. 2 shows the headlight supports 115$l$, 115$r$, and the sill to fender brackets 110$l$, 110$r$ as separate SMC carbon fiber molded parts, it should be appreciated that each of the left and right sides of the fender support system 130 may be molded in a single part. For example, fender support 120$l$, sill to fender bracket 110$l$, and headlight support 115$l$ may be molded as a single carbon fiber SMC part.

Figure 3:
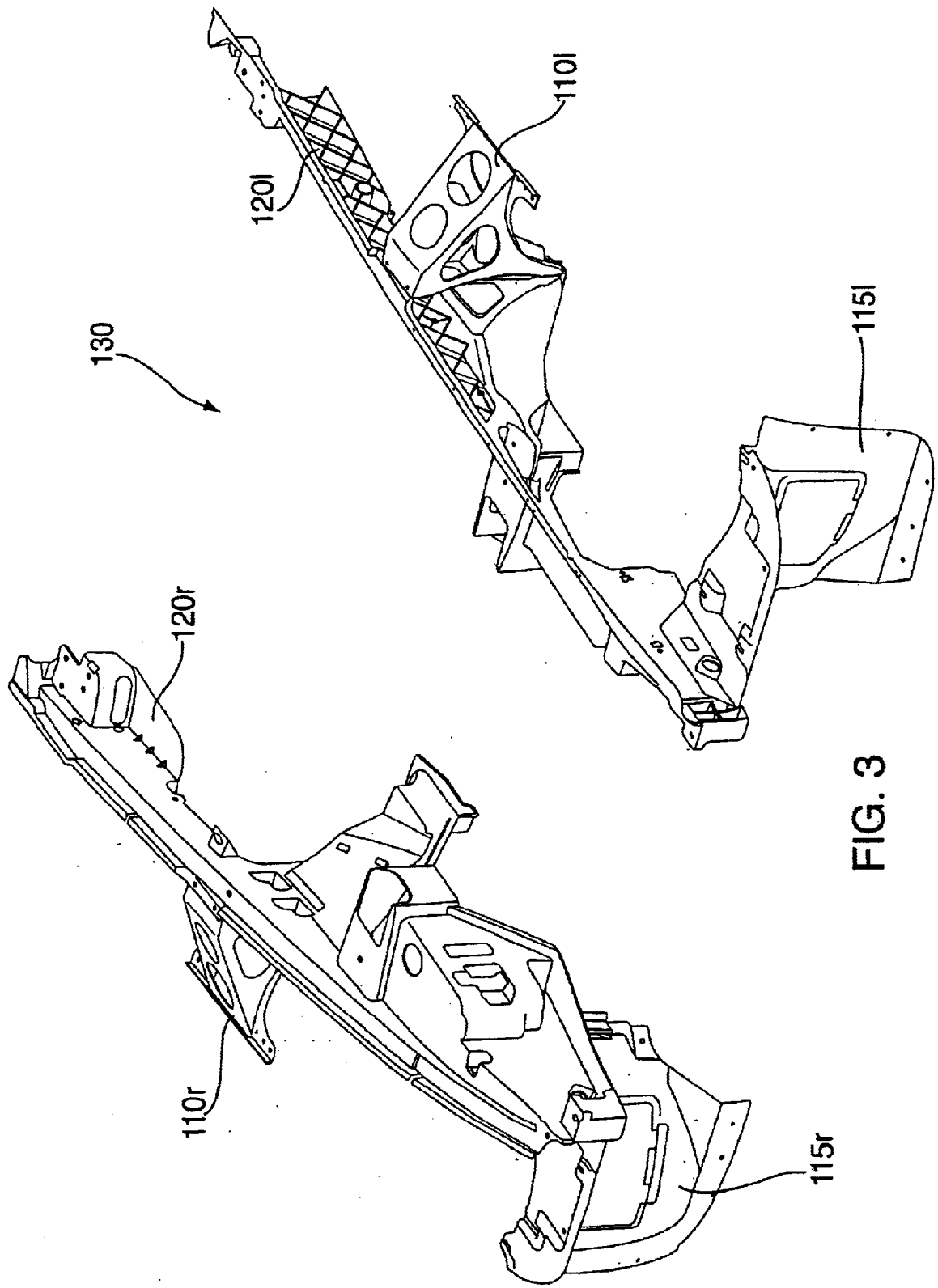
FIG. 3 shows the exemplary fender support system of FIG. 2 in a fully assembled state.

Referring to FIG. 3, there is seen an assembled fender support system 130 as illustrated in both FIGS. 1 and 2. As shown in FIG. 3, the headlight supports 115$l$, 115$r$, and the fender to sill brackets 110$l$, 110$r$ may be, for example, riveted to the fender supports 120$l$, 120$r$. However, it should be appreciated that the headlight support 115$l$, 115$r$ and the fender to sill brackets 110$l$, 110$r$ may be attached to the fender supports 120$l$, 120$r$ using any suitable connection arrangement, such as screws, bolts, nails, glue, and/or any combination of these.

Furthermore, it is believed to be advantageous that the headlight supports 115$l$, 115$r$, the fender to sill brackets 110$l$, 110$r$ and the fender supports 120$l$, 120$r$ are each formed as a separate carbon fiber SMC unit. In this manner, if the headlight supports 115$l$, 115$r$, and/or the fender to sill brackets 110$l$, 110$r$, break or become damaged, for example, during a tiny collision with another automobile, these parts may be replaced at relatively little cost and expense, without having to replace large carbon fiber SMC units.

Figure 4:
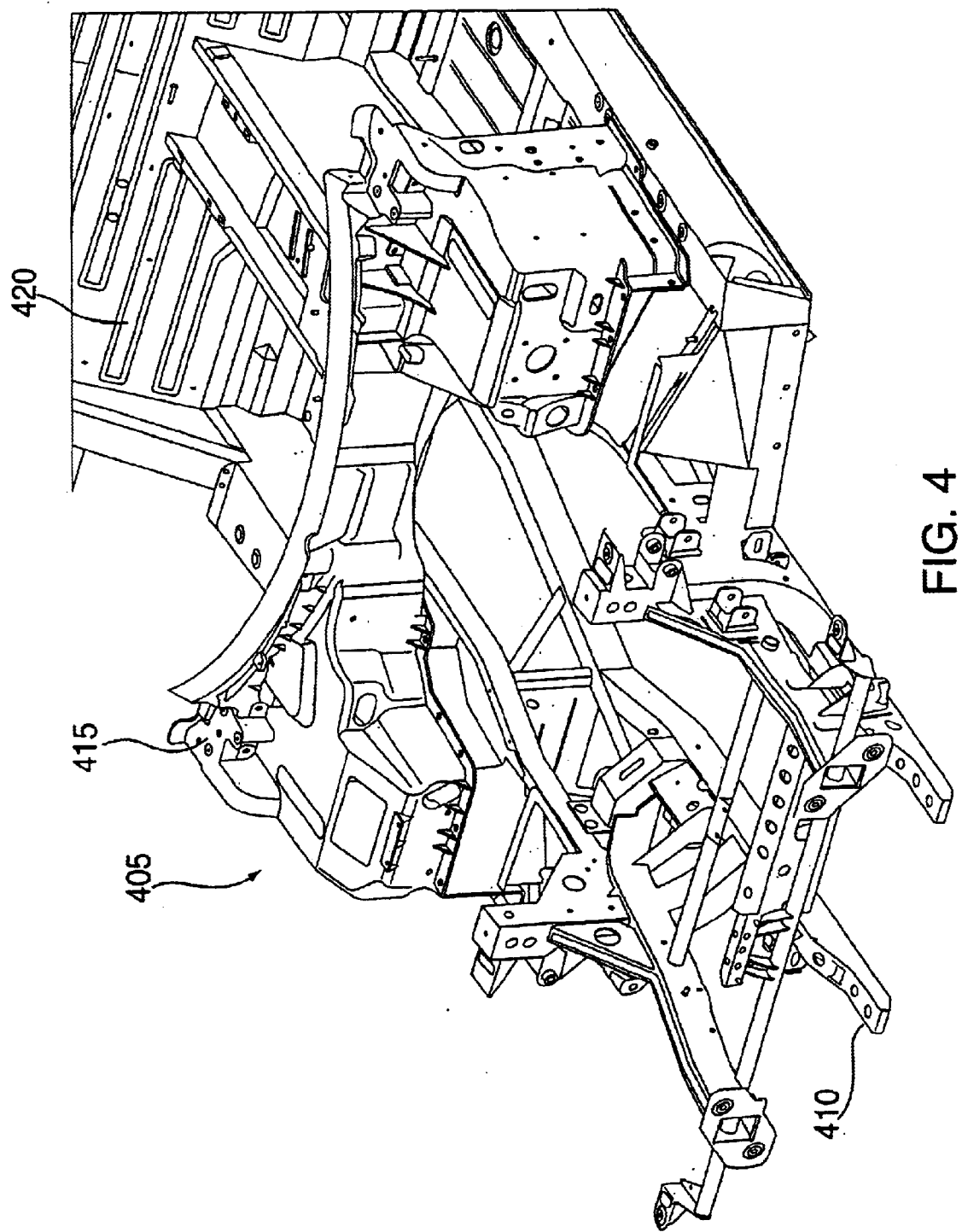
FIG. 4 illustrates an exemplary chassis interface according to the present invention.

Once assembled, the fender support system 130 may be mounted to a vehicle body. Referring now to FIG. 4, there is seen an exemplary chassis interface 405 according to the present invention. Chassis interface 405 includes a dash interface 415 as well as frame 410. Each of the dash interface 415 and the frame 410 may, for example, be fixedly coupled to a vehicle body 420, and each of dash interface 415 and frame 410 may be configured to rigidly couple to the fender support system 130 as shown in FIG. 5.

Figure 5:
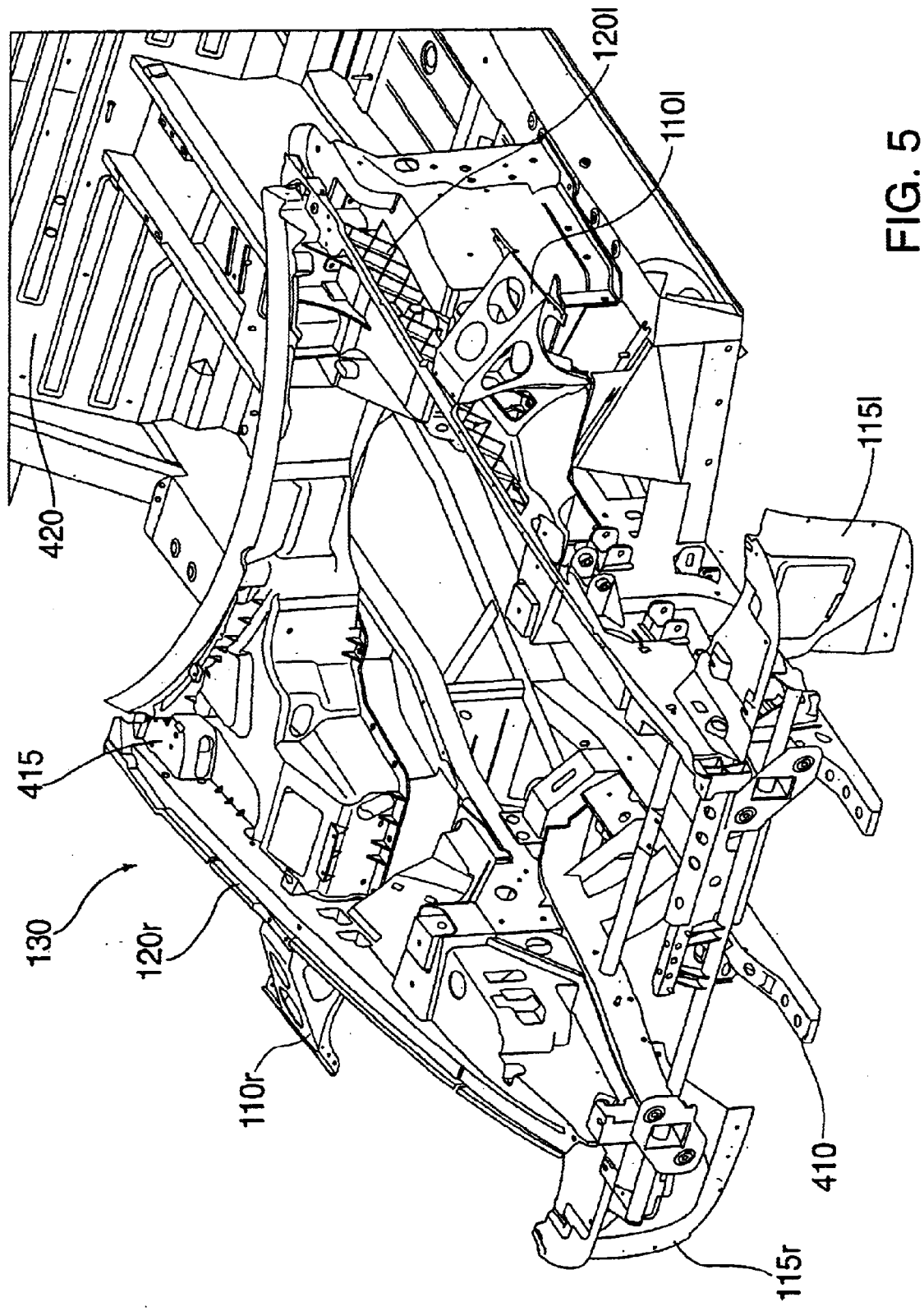
FIG. 5 illustrates the exemplary chassis interface of FIG. 4 connected to an exemplary fender support system according to the present invention.

Although FIGS. 4 and 5 show chassis interface 405 including two interface arrangements, i.e., dash interface 415 and frame 410, it should be appreciated that chassis interface 405 may include any number of arrangements operable to fixedly couple the fender support system 130 to the vehicle body 420.

Once the fender support system 130 is coupled to the car body 420 via the chassis interface 405, the fender support system 130 may, for example, provide primary and/or secondary attachment locations for a variety of under hood components.

Figure 6:
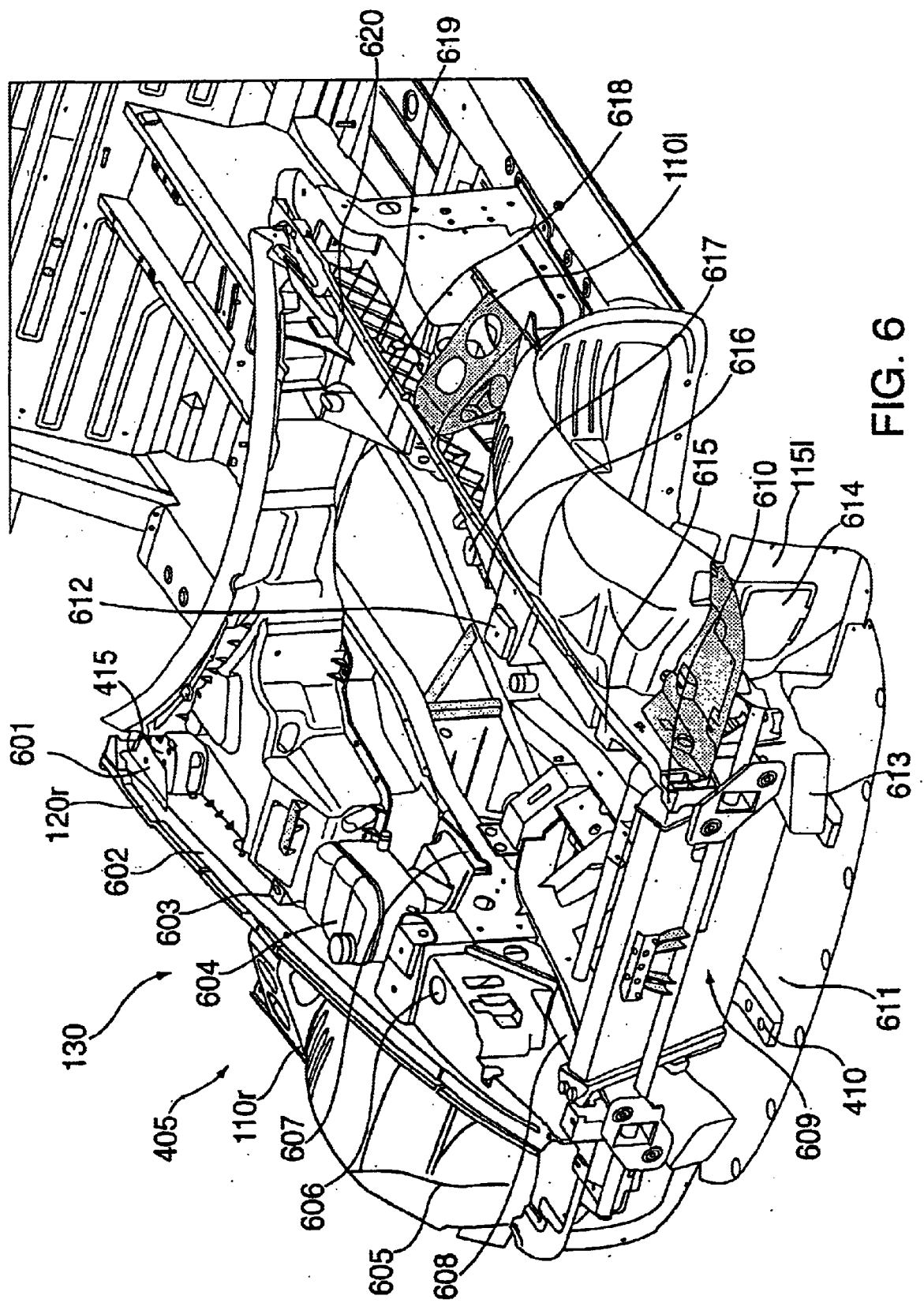
FIG. 6 illustrates another exemplary fender support system according to the present invention.

Referring now to FIG. 6, there is seen the exemplary fender support system 130 configured to provide primary and/or secondary attachments for hood hinges 601, a washer hose 602, under hood security switch 603, cooling pressure bottle 604, splash shields 605, washer bottle 606, oil radiator coolant and A/C lines 607, oil cooler 608, radiator 609, hood slam pads 610, belly pan 611, wiring harnesses 612, brake cooling ducts 613, foglamp access covers 614, engine controller 615, fuel purge solenoid 616, clutch fluid reservoir 617, power center and fuse panel 618, hood prop stud 619, hood side bumpers 620.

Figure 7:
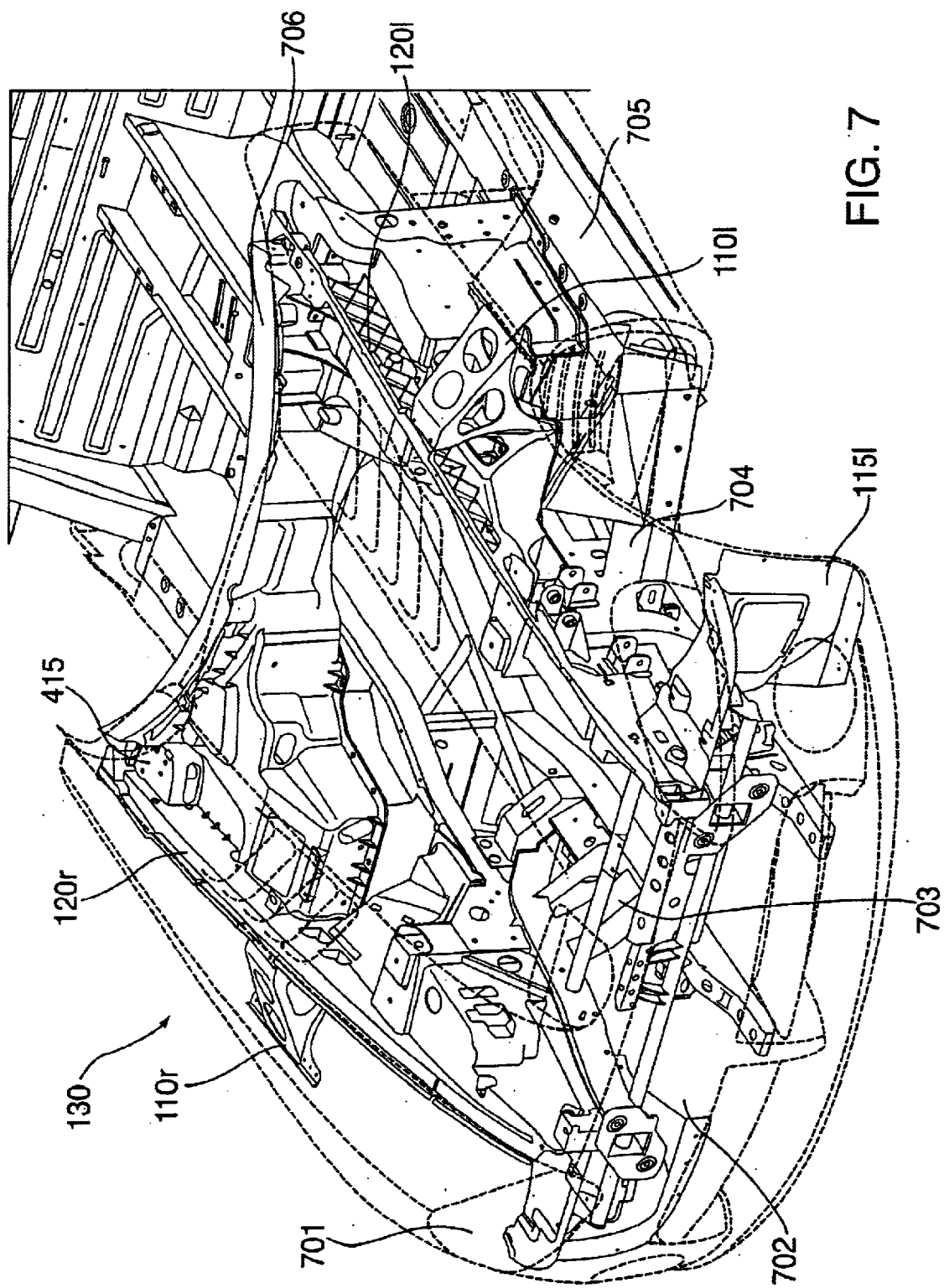
FIG. 7 illustrates yet another exemplary fender support system according to the present invention.

Fender support system 130 may also, for example, provide primary and/or secondary attachments for a variety of exterior body components. Referring now to FIG. 7, there is seen a fender support system 130 configured to provide primary and/or secondary attachments for headlamps 701, front fascia 702, hood 703, fenders 704, side sills 705, and cowl screens 706.

What is claimed is:

1. A fender support system, comprising:
   at least one molded fender support arrangement configured to couple to at least one fender arrangement, wherein the fender support arrangement is configured to provide at least one of primary and secondary attachments for under-the-hood vehicle components, and wherein the fender support arrangement includes at least one fender-to-sill bracket.

2. The fender support system according to claim 1, wherein the fender-to-sill bracket includes carbon fiber SMC.

3. A fender support system, comprising:

at least one molded fender support arrangement configured to couple to at least one fender arrangement; wherein the fender support arrangement is configured to provide at least one of primary and secondary attachments for under-the-hood vehicle components, wherein the molded fender support arrangement includes at least one fender support, at least one headlight support, and at least one fender-to-sill support; each of the fender support, the headlight support, and the fender-to-sill support being molded as a single carbon fiber SMC part.

4. A vehicle, comprising:

a fender support system including at least one molded fender support arrangement configured to couple to at least one fender arrangement; and a vehicle body coupled to the fender support system; wherein the fender support arrangement is configured to provide at least one of primary and secondary attachments for under-the-hood vehicle components, wherein the fender support arrangement includes at least one fender-to-sill bracket.

5. The vehicle according to claim 4, wherein the fender-to-sill bracket includes carbon fiber SMC.

6. A vehicle, comprising:

a fender support system including at least one molded fender support arrangement configured to couple to at least one fender arrangement; and a vehicle body coupled to the fender support system, wherein the fender support arrangement is configured to provide at least one of primary and secondary attachments for under-the-hood vehicle components, and wherein the molded fender support arrangement includes at least one fender support, at least one headlight support, and at least one fender-to-sill support, each of the fender support, the headlight support, and the fender-to-sill support being molded as a single carbon fiber SMC part.

* * * * *